US011930825B2

(12) United States Patent
Sammon et al.

(10) Patent No.: US 11,930,825 B2
(45) Date of Patent: Mar. 19, 2024

(54) DYNAMIC COOKING WITH LIMITED CONTROL AUTHORITY CONVEYOR COMPENSATION

(71) Applicant: Marmon Foodservice Technologies, Inc., Osseo, MN (US)

(72) Inventors: Jonathan Sammon, Oak Park, IL (US); Thomas Wittneben, Chicago, IL (US); Greg Klostermann, Arlington Heights, IL (US); Leonard Zelek, Chicago, IL (US); Nikolay Popov, Naperville, IL (US); Steven Shei, Fort Wayne, IN (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 388 days.

(21) Appl. No.: 17/090,442

(22) Filed: Nov. 5, 2020

(65) Prior Publication Data

US 2021/0127688 A1  May 6, 2021

Related U.S. Application Data

(60) Provisional application No. 62/984,626, filed on Mar. 3, 2020, provisional application No. 62/930,877, filed on Nov. 5, 2019.

(51) Int. Cl.
*A21B 1/48* (2006.01)
*A21B 1/40* (2006.01)
*G05D 23/19* (2006.01)

(52) U.S. Cl.
CPC .................. *A21B 1/48* (2013.01); *A21B 1/40* (2013.01); *G05D 23/1951* (2013.01)

(58) Field of Classification Search
CPC .................... A47J 37/044; A47J 37/045; A47J 37/067–0682; A21B 1/42–46;
(Continued)

(56) References Cited

U.S. PATENT DOCUMENTS

| 4,151,791 A | 5/1979 | Baker |
| 4,254,697 A | 3/1981 | Nils et al. |

(Continued)

FOREIGN PATENT DOCUMENTS

| EP | 2384135 | 8/2013 | |
| JP | 2004064002 A | * 2/2004 | ......... G05D 23/1951 |

(Continued)

OTHER PUBLICATIONS

Extended European Search Report for European Patent Application No. 20205055.5, dated Mar. 15, 2021.

(Continued)

*Primary Examiner* — Nathaniel E Wiehe
*Assistant Examiner* — Ket D Dang
(74) *Attorney, Agent, or Firm* — Andrus Intellectual Property Law, LLP

(57) ABSTRACT

A heat transfer system is arranged to cook multiple diverse food products. The heat transfer system includes at least one heat source. The at least one heat source is arranged within an enclosure and is operable by a controller to emit heat energy into the enclosure. First and second cooking conveyors are arranged within the enclosure. The first cooking conveyor is configured to move a first food product through the enclosure. The second cooking conveyor is configured to move a second food product through the enclosure. A speed of the first cooking conveyor and a speed of the second cooking conveyor are independently controlled to independently adjust the cooking time of the first food product and the second food product during operation of the heat transfer system.

18 Claims, 10 Drawing Sheets

(58) Field of Classification Search
CPC ........ A21B 1/48; A21B 1/40; G05D 23/1917; G05D 23/1951
USPC .......................................................... 99/443
See application file for complete search history.

(56) References Cited

U.S. PATENT DOCUMENTS

| | | | |
|---|---|---|---|
| 4,389,562 A | | 6/1983 | Chaudoir |
| 4,881,519 A | | 11/1989 | Henke |
| 4,951,648 A | | 8/1990 | Shukla et al. |
| 5,179,265 A | | 1/1993 | Sheridan et al. |
| 5,253,564 A | | 10/1993 | Rosenbrock et al. |
| 5,588,354 A | | 12/1996 | Stuck et al. |
| 5,724,886 A | | 3/1998 | Ewald et al. |
| 5,947,012 A | | 9/1999 | Ewald et al. |
| 6,035,764 A | * | 3/2000 | Miyagawa ............ A47J 37/044 99/417 |
| 6,035,765 A | | 3/2000 | Finck |
| 6,119,587 A | | 9/2000 | Ewald et al. |
| 6,209,447 B1 | | 4/2001 | Ewald et al. |
| 6,358,548 B1 | | 3/2002 | Ewald et al. |
| 6,481,999 B2 | * | 11/2002 | Knost ....................... A21B 1/26 198/825 |
| 6,595,117 B1 | | 7/2003 | Jones et al. |
| 6,607,766 B2 | | 8/2003 | Ewald et al. |
| 6,624,396 B2 | | 9/2003 | Witt et al. |
| 6,786,422 B1 | | 9/2004 | Wortman et al. |
| 6,817,283 B2 | | 11/2004 | Jones et al. |
| 7,038,172 B1 | | 5/2006 | Stuck |
| 7,091,452 B2 | | 8/2006 | Kingdon et al. |
| 7,105,779 B2 | | 9/2006 | Shei |
| 7,227,102 B2 | | 6/2007 | Shei |
| 7,297,903 B1 | | 11/2007 | March et al. |
| 7,303,776 B2 | | 12/2007 | Sus et al. |
| 7,340,992 B1 | * | 3/2008 | Wolfe ..................... A47J 37/045 99/443 C |
| 7,726,967 B2 | | 6/2010 | Best |
| 7,765,918 B2 | | 8/2010 | Garniss et al. |
| 7,800,023 B2 | | 9/2010 | Burtea et al. |
| 7,851,727 B2 | | 12/2010 | Burtea et al. |
| 7,853,129 B2 | | 12/2010 | Best |
| 7,905,173 B2 | | 3/2011 | Sus et al. |
| 7,921,767 B2 | | 4/2011 | Cook et al. |
| 8,033,213 B2 | | 10/2011 | Cook et al. |
| 8,087,407 B2 | | 1/2012 | Wiker et al. |
| 8,272,320 B2 | | 9/2012 | Baker et al. |
| 8,281,779 B2 | | 10/2012 | Wiker et al. |
| 8,371,285 B2 | | 2/2013 | Wiker et al. |
| 8,522,675 B2 | | 9/2013 | Veltrop |
| 8,656,904 B2 | | 2/2014 | Wortman et al. |
| 8,695,489 B2 | | 4/2014 | Ewald et al. |
| 8,839,714 B2 | | 9/2014 | Schjerven, Sr. et al. |
| 8,839,779 B2 | | 9/2014 | Wiker et al. |
| 8,997,636 B2 | | 4/2015 | Kirby et al. |
| 9,433,321 B2 | | 9/2016 | Piazzi |
| 9,585,400 B2 | | 3/2017 | Wiker et al. |
| 9,585,401 B2 | | 3/2017 | Wiker et al. |
| 9,609,981 B2 | | 4/2017 | Schjerven, Sr. et al. |
| 9,693,655 B2 | | 7/2017 | Shei et al. |
| 9,980,322 B1 | | 5/2018 | Kestner et al. |
| 10,004,358 B2 | | 6/2018 | Wildebush |
| 10,039,289 B2 | | 8/2018 | Wiker et al. |
| 10,244,894 B2 | | 4/2019 | Boltz et al. |
| 10,362,898 B2 | | 7/2019 | Schjerven, Sr. et al. |
| 10,674,734 B1 | * | 6/2020 | French ...................... A21B 3/02 |
| 2003/0042248 A1 | | 3/2003 | Witt et al. |
| 2003/0056658 A1 | | 3/2003 | Jones et al. |
| 2008/0289619 A1 | | 11/2008 | Schjerven, Sr. et al. |
| 2010/0058936 A1 | | 3/2010 | Schjerven, Sr. et al. |
| 2011/0226230 A1 | | 9/2011 | Reese et al. |
| 2011/0269085 A1 | * | 11/2011 | Wiker ...................... A21B 1/48 219/388 |
| 2014/0199446 A1 | | 7/2014 | Huegerich |
| 2016/0138806 A1 | * | 5/2016 | Della Rocca ........... F23L 7/002 431/75 |
| 2016/0296068 A1 | | 10/2016 | Schjerven, Sr. et al. |
| 2017/0035234 A1 | | 2/2017 | Schjerven, Sr. et al. |
| 2017/0099987 A1 | * | 4/2017 | Patel ..................... A47J 37/045 |
| 2017/0328598 A9 | | 11/2017 | Wortman et al. |
| 2018/0289209 A1 | | 10/2018 | Yazvin et al. |
| 2018/0296035 A1 | | 10/2018 | Wildebush |
| 2018/0338503 A1 | | 11/2018 | Wiker et al. |
| 2019/0239516 A1 | * | 8/2019 | Sergent .................... A21B 1/26 |
| 2019/0290063 A1 | | 9/2019 | Shei |

FOREIGN PATENT DOCUMENTS

| | | | | |
|---|---|---|---|---|
| WO | WO-2018060628 A1 | * | 4/2018 | ............ A21B 1/245 |
| WO | 2020091840 | | 5/2020 | |

OTHER PUBLICATIONS

"Nieco Model FH94 Gas Owner's Manual", Nieco, retrieved from https://nieco.com/wp-content/uploads/2020/04/FH94G-Manual-2020.pdf on Oct. 28, 2020.

"Nieco FH94 Back of House: The Broiler Built by Combining 45 years of BK Experience & Innovation", Nieco, published Oct. 2019, retrieved from https://nieco.com/wp-content/uploads/2019/10/Nieco-FH94-Sales-Sheet.pdf on Oct. 28, 2020.

* cited by examiner

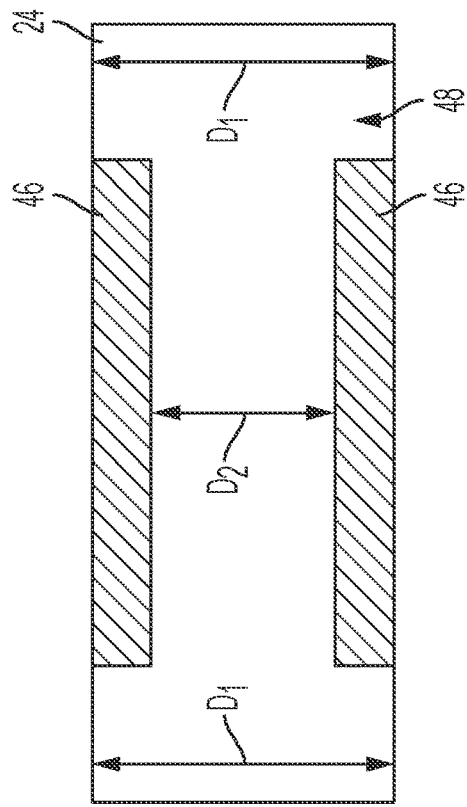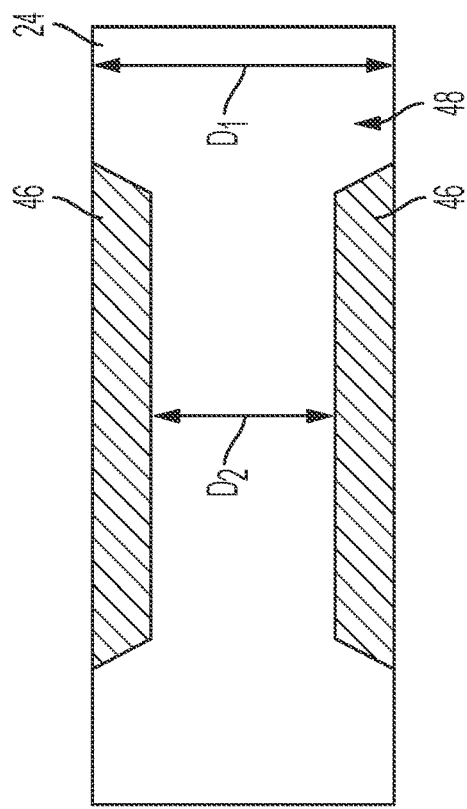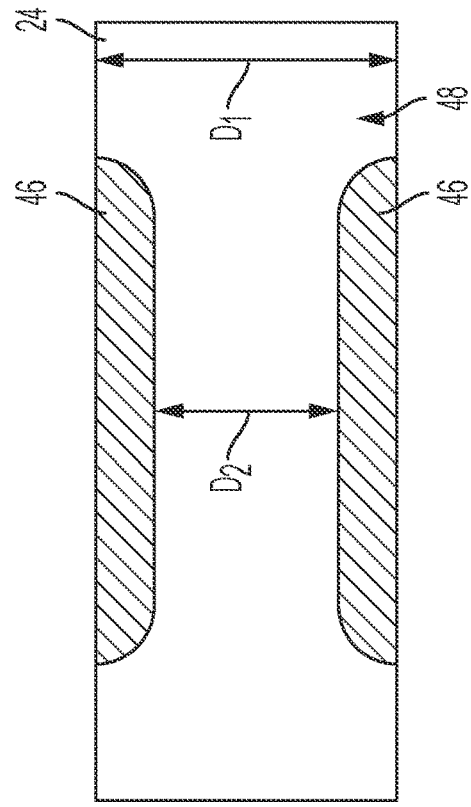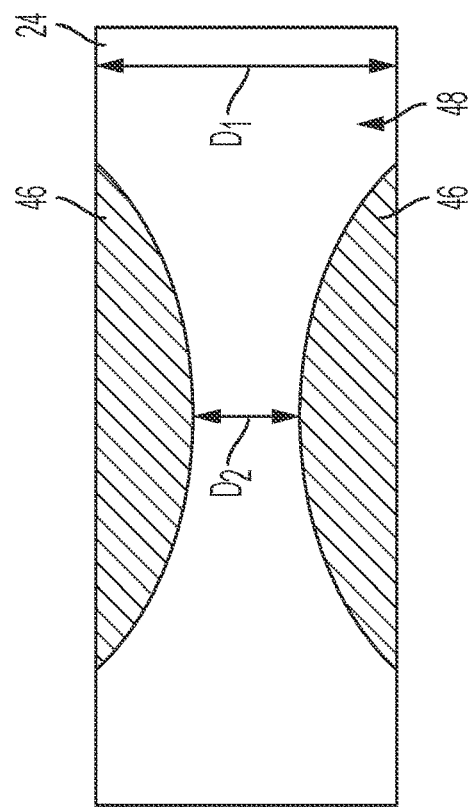

DYNAMIC COOKING WITH LIMITED CONTROL AUTHORITY CONVEYOR COMPENSATION

CROSS REFERENCE TO RELATED APPLICATIONS

The present application claims priority to U.S. Provisional Patent Application No. 62/984,628, filed on Mar. 3, 2020 and claims priority to U.S. Provisional Patent Application No. 62/930,811, filed on Nov. 5, 2019, both of which are incorporated by reference herein in their entireties.

BACKGROUND

The present disclosure relates to heat treatment of food. More specifically, the present disclosure relates to a system and method for controlling the temperature, quality or "doneness" of a cooked food product in response to varying temperature and heat transfer conditions. In various embodiments, the cooking appliance may be a broiler, oven, toaster, or the like for cooking, baking, or toasting a plurality of food items.

U.S. Pat. No. 10,004,358, entitled, "Toaster with Controlled Conveyor Speed" relates to a toaster with multiple independently controllable conveyors. An expected estimated heat output is calculated and the speed of each conveyor can be modified based on the expected heat output to achieve the desired cook time for each food product.

U.S. Pat. No. 5,179,265, entitled, "Cooking Time Control System for Conveyor Ovens" relates to a control system for conveyor ovens. The system monitors and controls the oven temperature and the speed with which products are moved through the oven on the conveyor. The system measures the oven temperature and determines the degree of product processing that has occurred in a sample interval, and then adjusts the conveyor velocity as a function of the degree of product processing.

U.S. Pat. No. 9,585,400, entitled, "Conveyor Oven Apparatus and Method" relates to a conveyor oven in which a set-point of the oven is controlled based upon the detection of food product upstream of the oven heating element.

Heat transfer systems may be used to provide thermal energy to a broiler, oven, toaster, or the like for use in the heat treatment of food items to achieve cooking, baking, or toasting of the food item. Conveyor systems move the food item in relation to a heat transfer system to achieve a continuous cooking, baking, or toasting process. Similar conveyor systems are used in industrial applications for heat treatment, drying, and curing processes. In the present disclosure, the exemplary embodiment of a chain-driven charbroiler cooking a hamburger patty will be used, although it will be recognized that other forms of broilers, ovens, or toasters may be similarly configured and other foods, including, but not limited to pizza, pizza crusts, bread, buns, toasted sandwiches, chicken cuts or patties, fish cuts or patties, beef cuts, plant or other protein patties, or the aforementioned hamburger patties may be heat treated in the manners as described herein.

Heat treating cooking appliances as described above are known to create temperature gradient within the interior of the appliance. Often the cooking appliance is open at one or both ends. If the cooking appliance is open at both ends, a conveyor may receive a food time at one end and deposit a heat treated food item at the other end. If the cooking appliance is open at one end, an internal return system directs the heat treated food item back in the direction of the first end so that the heat treated food items are deposited in a vicinity of the location where the food items are initially received. Solutions that provide for improved heat distribution within an appliance will result in more consistent temperatures and heat treatment within the appliance are useful.

Presently available cooking appliances permit the modification of one or more input cooking parameters to achieve a desired finished food product. For example, these input cooking parameters may include a cook time and a heating element temperature. The one or more input cooking parameters may be collectively known as a "recipe." The recipe may be unique to the food product. In other words, the recipe for a frozen beef patty may differ from the recipe for a refrigerated chicken breast which may differ from the recipe for a frozen fish cut. In other cases, a single recipe may be utilized for multiple food products. The recipes may be relatively elaborate, with certain cooking parameters adjusted at different points in the cooking process. For example, a contact hamburger griddle for a batch cooking process may utilize a recipe that includes instructions for controlling the distances between heating elements over different portions of the cook cycle, thus squeezing hamburger patties to particular thicknesses for specific periods of time.

However, with increased menu specialization and customer food demands, it is desirable to cook two or more dissimilar products at the same time with the same appliance. If the starting and finishing qualities, cooking temperature, and/or doneness temperature of the two products are similar, then consistent cooking may be achieved. However, as the two food products become more dissimilar, the cooking consistency and final cooked temperature of the food products become inconsistent. One factor into this is the different in fat content of two dissimilar food products, resulting in differing levels of combustion flare-ups.

BRIEF DISCLOSURE

An example of a heat transfer system is for cooking multiple diverse food products. At least one heat source arranged within an enclosure and operable by a controller to emit heat energy into the enclosure. A first cooking conveyor is arranged within the enclosure to a first food product through the enclosure past the at least one heat source. A second cooking conveyor is arranged within the enclosure to move a second food product through the enclosure past the at least one heat source. Speeds of the first cooking conveyor and the second cooking conveyor are independently controlled to adjust a cooking time of the first food product relative to the second food product.

In further examples of a heat transfer system include at least one temperature sensor located within the enclosure. The at least one temperature sensor provides temperature measurements to the controller for use in operating the at least one heat source with the controller to achieve a target temperature at the at least one temperature sensor within the enclosure. The controller identifies a limited control authority condition of the at heat transfer system and operates at least one of the first cooking conveyor or the second cooking conveyor in response to the identification of the limited control authority condition. The limited control authority condition is identified when the at least one heat source is operated at a maximum or a minimum output. When at least one heat source is operated at a maximum output and a temperature measurement at the at least one sensor is below the target temperature, the controller operates to slow at least one of the first cooking conveyor or the second cooking conveyor. When the at least one heat source is operated at a minimum output and a temperature measurement at the at least one sensor is above the target temperature, the controller operates to slow at least one of the first cooking conveyor or the second cooking conveyor. The limited control authority condition may be identified upon the detection of a localized flare-up condition. The localized flare-up condition may be detected based upon a rapid localized increase in temperature. The localized flare-up condition may be detected based upon imaging within the enclosure. The localized flare-up condition may be a flare-up condition isolated to the first cooking conveyor. A cooking conveyor may slow down to increase the thermal treatment of the second food product. A cooking conveyor may speed up to decrease the thermal treatment of the first food product. The controller may monitor the temperature measurements from the at least one temperature sensor and identify the limited control authority based at least in part upon the temperature measurements. The limited control authority may be based upon at least one of a rapid localized increase in the temperature measurements and a temperature deviation from the target temperature combined with the at least one heat source operated at a maximum or a minimum output.

In still further examples of heat transfer systems, the first food product is different from the second food product. The at least one heat source includes a heating element and an effective surface area of the heating element varies along the heating element. The heat source is arranged with an elongated dimension perpendicular to a direction of operation of the first cooking conveyor and the second cooking conveyor. A mask is positioned relative to the heating element. The mask defines the effective surface area of the heating element along the heating element and the effective surface area of the heating element varies along the elongated dimension of the heating element. The mask is movable relative to the heating element to modify the effective surface area of the heating element during operation of the heat transfer appliance. The movement of the mask is responsive to a temperature within the open interior.

BRIEF DESCRIPTION OF THE DRAWINGS

FIGS. 8A-8D depict examples of heating element mask configurations.

DETAILED DISCLOSURE

Figure 1:
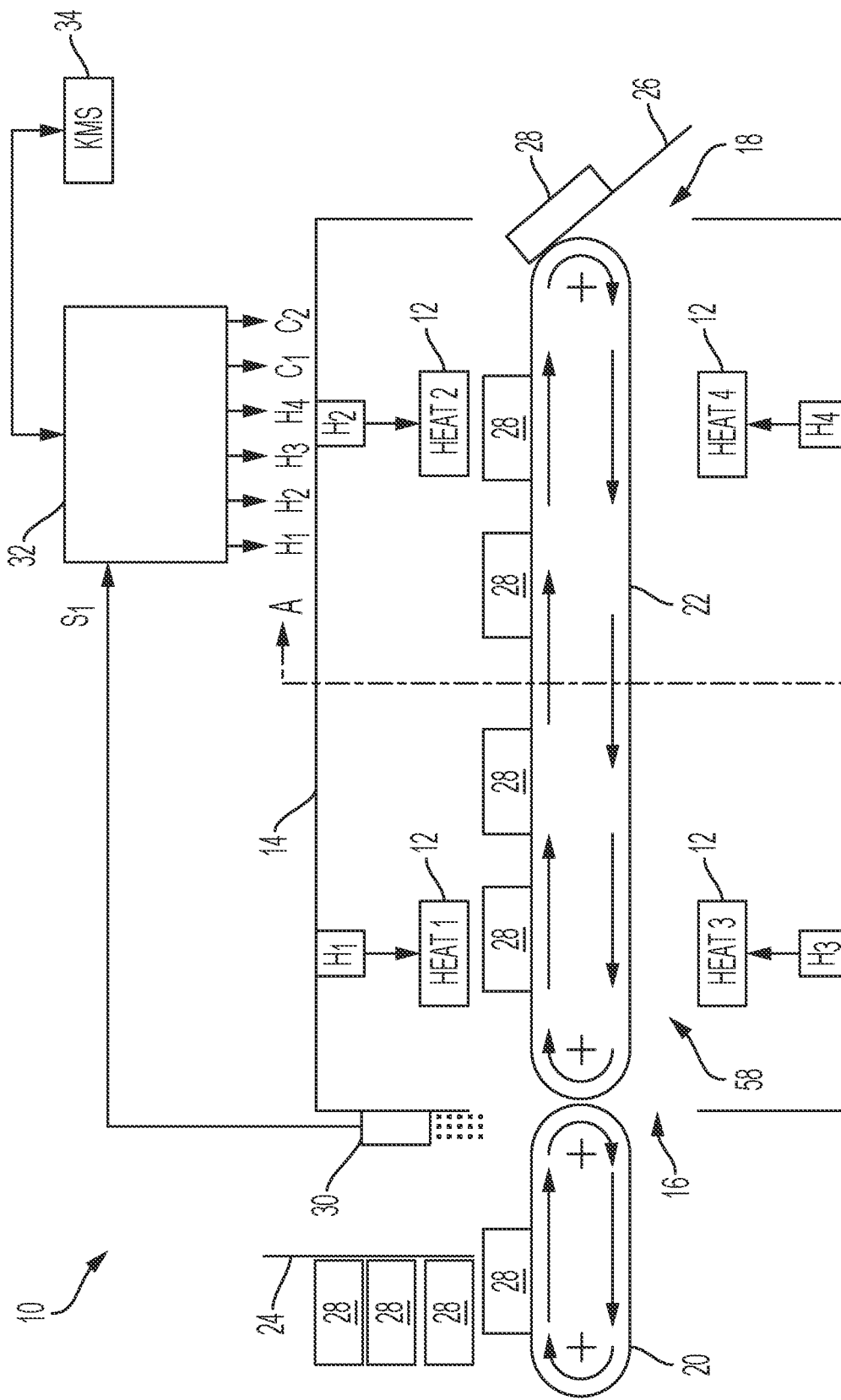
FIG. 1 depicts an example of a conveyor broiler.

FIG. 1 is a side-sectional view of an example of a broiler 10. It will be recognized that the broiler 10 of FIG. 1 is merely exemplary and other embodiments will fall within the scope of the present disclosure that includes more or fewer components than depicted in FIG. 1. That is, a person of ordinary skill in the art will recognize from the present disclosure that the embodiment shown and described with respect to FIG. 1 may be modified or rearranged or implemented with more or fewer systems or components and arrive at an embodiment within the scope of the present disclosure. In addition, although the implementations herein are described with reference to a broiler appliance, the systems and methods of the present disclosure could be utilized with any batch or continuous cooking appliance, including but not limited to, fryers, combination ovens, and toasters.

Broiler 10 is shown to include multiple heat transfer elements or heat sources 12 surrounded by an enclosure 14. Each heat source 12 as exemplarily described herein may be a gas burner. In other examples, the heat sources 12 may be electric heating elements, infrared heating elements, or any other suitable form of heating element as would be recognized by one of ordinary skill in the art. Although FIG. 1 depicts the broiler 10 as including four heat sources 12, other embodiments may include one, two, six, or any other desired number of heat sources 12, in any arrangement or configuration, as will be recognized by a person having ordinary skill in the art in view of the present disclosure. Further examples and details of heat transfer devices, including broilers, as may be used with the disclosure as provided herein are described in U.S. Patent Publication No. 2019/0290063, entitled "Heat Transfer System," and U.S. Patent Publication No. 2018/0289209, entitled "Toaster with Adjustable Conveyor," which are incorporated by reference herein in their entireties. Another example of an oven is described in U.S. Pat. No. 5,179,265, entitled "Cooking Time Control System for Conveyor Ovens," which is incorporated by reference herein in its entirety.

The enclosure 14 is formed by a plurality of walls. In an exemplary embodiment, the walls of the enclosure 14 are constructed of sheet metal. The enclosure 14 defines an open interior 58 within the enclosure 14. The enclosure 14 includes a food product inlet 16 that permits the ingress of a food product 28 to the cooking area exposed to heat sources 12 within the open interior 58 of the enclosure 14. The enclosure 14 further includes a food product outlet 18 that permits the egress of the food product 28 from the cooking area of the open interior 58 of the enclosure 14. A cooking conveyor 22 extends generally through the open interior 58 of the enclosure 14 between the inlet 16 and the outlet 18. The types of food product 28 cooked by a cooking appliance as described herein may include raw, uncooked, par-baked, or frozen versions of food products. The food products may have a variety of sizes or weights, and may include, but are not limited to, hamburger patties, chicken breasts, bread, and pizza.

Food product 28 may be supplied to the food product inlet 16 using a loading conveyor 20 and a loading assembly 24. Operation of the loading conveyor 20 moves food product 28 toward the food product inlet 16 of the enclosure 14. The loading assembly 24 may be any suitable device configured to store multiple food products 28 and to automatically deposit food product 28 onto the loading conveyor 20, which may for example be a hopper or magazine. In this way, a cooking cycle can be completed for a desired amount of food product 28 even when the desired amount of food product 28 exceeds a capacity of the enclosure 14. In other words, a cooking cycle for 30 hamburger patties can be completed for an enclosure 14 with a maximum capacity of 5 patties without the need for manual intervention. However, in other examples, both the loading conveyor 20 and the loading assembly 24 may be omitted from the broiler 10, and food product 28 may be manually inserted into the enclosure 14 by a user.

Food product 28 is moved through broiler 10 on the cooking conveyor 22. In an example, heat sources 12 are situated both above and below the cooking conveyor 22 in order to complete a cooking process of the food product 28. Although FIG. 1 depicts the cooking conveyor 22 as fully contained within the enclosure 14, in other examples, the cooking conveyor 22 can extend to or beyond the food product inlet 16. For example, the cooking conveyor 22 may extend beyond the cooking inlet 16 and to the exterior of the enclosure 14 in cases where the loading conveyor 20 and the loading assembly 24 are omitted from the broiler 10. A food product discharge ramp 26 is shown to be situated in the food product outlet 18. The food product discharge ramp 26 may be any device or assembly that deposits finished food product 28 in a desired location for further preparation, service, or storage. In some examples, the food product discharge ramp 26 may deposit finished food product 28 in a storage container that is subsequently removed from the broiler 10 by a user. In other examples, the food product discharge ramp 26 deposits finished food product 28 into a warming area disposed within or adjacent to the enclosure 14 (not depicted).

Broiler 10 is further shown to include an inlet sensor 30. It will be recognized that more or fewer sensors may be used in association with other embodiments while remaining within the scope of the present disclosure. Inlet sensor 30 may be any type of sensing device configured to collect data indicating the presence of a food product 28 in the vicinity of the food product inlet 16. Although inlet sensor 30 is depicted as positioned on the exterior of the enclosure 14 and above the cooking conveyor 22, in other examples, the inlet sensor 30 may be located on the interior of the enclosure 14, level with the cooking conveyor 22, or above the loading conveyor 20. The position of the inlet sensor 30 may be dependent on the field of view or the observable space the inlet sensor 30 is able to detect.

In various examples, the inlet sensor 30 may be a photosensor or camera, a laser time-of-flight sensor, an ultrasonic sensor, or a temperature sensor. The type of inlet sensor 30 may dictate the means of detecting the presence of the food product 28 in the food product inlet 16. For example, an inlet sensor 30 of a photosensor or camera may be configured to distinguish an outline of the food product 28 (e.g., a round hamburger patty) from a cooking conveyor 22. Similarly, an inlet sensor 30 of a temperature sensor may be configured to distinguish a surface temperature of a food product 28 (e.g., a frozen or refrigerated hamburger patty) from a surface temperature of the cooking conveyor 22.

Inlet sensor 30 transmits collected data as data signal Si to a controller 32. The controller 32 may be internal to the broiler 10 or it may be external to the broiler 10. In an example, the controller 32 is a computer processor that is located within the broiler 10, in a location shielded from the heat, humidity, and food particles of the broiler 10. In another example, the controller 32 is a computer that is located remotely from the broiler 10 and for example, receives the sensor data either through wired or wireless communication and returns control signals as described in further detail herein through a similar communicative connection.

The broiler 10 exemplarily includes multiples of many components and systems. Thus, it will be recognized from this disclosure that embodiments of the broiler 10 may include one, two, or more than two of these disclosed systems in a manner so as to provide desired cooking appliance capacity, product flexibility, and efficiency. As disclosed in further detail herein, the broiler 10 may include two or more cooking conveyors 22 arranged in a parallel configuration within the enclosure 14. If the broiler 10 includes multiple cooking conveyors 22, the controller 32 may store food product recipes particular to a conveyor, or compensation factors that are applied to each food product recipe based on the cooking characteristics of a conveyor. For example, the cook time for each food product recipe completed on a cooking conveyor 22 located on the left side of the broiler 10 may be 5 seconds longer than the food product recipe for a cooking conveyor 22 located on the right side of the broiler 10 to compensate for a vent outlet located near the left side of the broiler 10.

The computer processor of controller 32 may be integral with or communicatively connected to a computer-readable medium upon which computer-readable code is stored. Upon execution of the computer-readable code by the processor, the processor performs functions and calculations and subsequently transmits control signals to the heat sources 12, the loading conveyor 20, and the cooking conveyor 22. The same or another computer-readable medium may be communicatively connected to the processor and cooking models may be stored thereon for access and use by the processor. These cooking models may correlate control temperatures $H_1$-$H_4$ for the heat sources 12 and control speeds $C_1$ and/or $C_2$ as will be described in further detail herein.

The controller 32, executing the computer-readable code and informed by the cooking models operates the various components of the broiler 10 at different conditions, for example, to provide more or less heat at the top or bottom of the food product 28, or to control the speed of the cooking conveyor 22 to control the overall cooking time. Control of the cooking conveyor 22 can determine the cooking time or time that the food product 28 is exposed to particular conditions created by one or more heat sources 12 adjacent to the cooking conveyor 22. Control of the heat sources 12 includes adjustment of the heat input into particular locations within the enclosure 14. All of these components provide control over the cooking process and therefore can be changed to accurately and repeatedly cook different types of food.

In some embodiments, the controller 32 is communicatively connected to a kitchen management system (KMS) 34, and receives food product recipes or other control signals therefrom. In various embodiments, the KMS 34 may be directly communicatively connected to the broiler 10 or may be communicatively connected to the broiler 10 through an internet-of-things (IOT) communications system which provides distributed communication to communication-enabled devices in the kitchen, including the broiler 10.

Figure 2A:
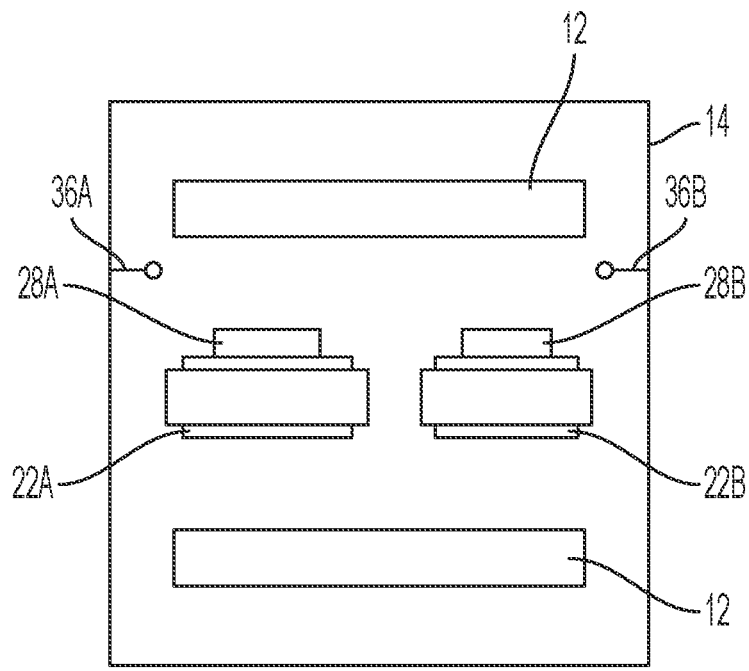
FIG. 2A is a front sectional view of an example of a broiler as noted by line A-A of FIG. 1.
Figure 2B:
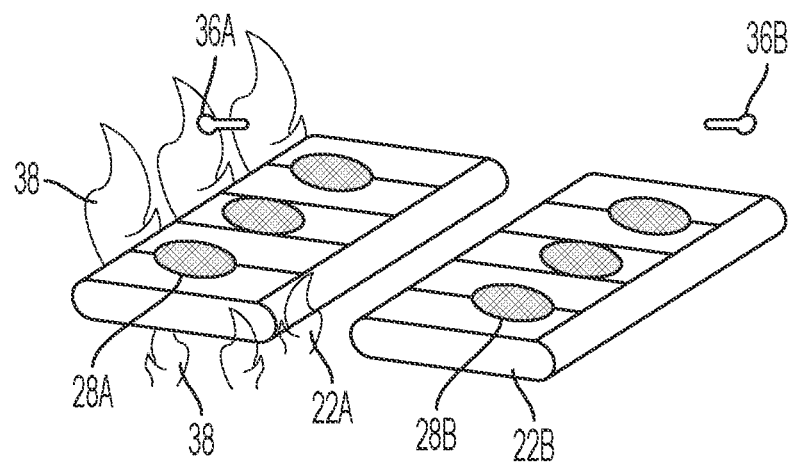
FIG. 2B is a perspective view of conveyors.

FIG. 2A is a front sectional view of the broiler 10 as noted by line A-A of FIG. 1. FIG. 2B is a perspective view of conveyors 22A, 22B for example as within an enclosure 14 (FIGS. 1 and 2A) of a broiler 10. While both conveyors 22A, 22B may be used to cook the same kind of food products, exemplarily the conveyors 22A, 22B are configured for cooking different food products 28A, 28B. In examples, the two food products may be two different sizes of hamburger, or the two food products may be more different, for example a hamburger patty and a whole chicken breast. Other examples of different food products will be recognized based upon the present disclosure. The broiler 10 includes at least two temperature sensors 36A, 36B, for example thermocouples, positioned above the respective conveyors 22A, 22B. The temperature sensors measure the temperature within the broiler relative to each of the conveyors 22A, 22B. It will be recognized that in other examples more than on pair of temperature sensors may be used at various positions along the conveyors 22A, 22B. It will be noted that in some examples, the temperature sensors 36A, 36B are provided in similarly located pairs so that comparable measurements of temperature may be obtained relative to the conveyors 22A, 22B.

The heat output of the respective heat sources 12 may be modulated by reducing the energy input into the element, such as by reducing the gas pressure supplied to a gas burner or reducing the voltage/current supplied to an electrical heater. A software control system, such as a PID algorithm, can use the indicated temperature received from the temperature sensors 36A, 36B in order to determine an appropriate level of modulation to keep the broiler or zones of the broiler at a chosen setpoint temperature, as indicated by the temperature sensors 36A, 36B. This may be conducted globally (with one software controller modulating all the heating elements in a broiler targeting one overall broiler temperature) or locally (controlling individual heating elements based on temperature sensors 36A, 36B that monitor only the temperature of the zone immediately around each heating element).

While the control method described above is capable of adjusting broiler operation to external factors such as drafts of cold air through a kitchen or HVAC operation changes, and to internal factors, such as flare-ups of flaming grease from cooked product, the inventors have identified limitations to this system and the need for further improvement to better provide consistent temperature, quality, and/or "doneness" of the cooked product, particularly when simultaneously cooking different food products.

There are several difficulties with this described system of broiler control. Foremost is the issue that temperature sensors can give inaccurate readings when exposed to flames, for example when exposed to a flare-up of grease. During such exposure, the temperature sensors may provide temporarily inaccurately high readings. As shown in FIG. 2B, flames 38 in the vicinity of conveyor 22A may cause temperature sensor 36A to provide an inaccurately high temperature reading, particularly relative to temperature sensor 36B. Flame in a broiler occurs frequently during the cooking of some products such as hamburgers due to the fat content of the hamburger. As the hamburger cooks, the fat renders and the grease is susceptible to combustion. Other products, like chicken or plant-based proteins, may produce comparatively less or any grease for combusting and thus very little flame. It has been found that the inaccurate temperature reading (of temperature sensor 36A) due to the flame 38 causes the software controller to reduce the energy output of the heat source 12 by too much.

A reduction in the output of the heat source 12 may be the appropriate control response to the additional heat provided to a flare-up in some cases. However, it has been recognized by the inventors that the temperature sensor 36A overrepresents the temperature in the broiler in response to a flare-up. First, the flare-up tends to only increase the temperature locally to the flare-up and the heat added to the system is transient with the flare-up, while the temperature sensor reading is used as representative for an area larger than the localized flare-up. Secondly, it has been recognized that the additional heat from the flare-up may cause hysteresis elevated temperature measurements after the flare-up has ended. This may result in the cook energy supplied to the heat sources 12 remaining too low in a response to compensate for after the excess thermal energy from the flare-up ends. In a further example, of a broiler with globally controlled heat sources 12 and multiple parallel cooking conveyors 22A, 22B (as depicted in FIGS. 2A and 2B), flare-up associated with one cooking conveyor (e.g. 22A) may raise the temperature measured by the temperature sensor 36B associated with the other cooking conveyor 22B, resulting in reduced thermal energy delivered to the whole broiler and under-treatment of the food product 28B on the conveyor 22B. While the existing flare-up flames 38 add energy on the one conveyor 22A with which it is associated, the flare-up may minimally impact the heat energy delivered to the other food product 28B on the cooking conveyor 22B. This may result in product on a cooking conveyor 22B, without a flare-up, being under-cooked. This particularly occurs when one cooking conveyor 22A is used to cook a comparatively flammable food product 28A (such a hamburger, which drips grease that is likely to flame up spontaneously) while the other cooking conveyor 22B is used to cook a food product 28B that tends to not flare up (such as a piece of chicken or a plant-based protein, which do not drip much grease).

The inventors have identified further instances in the normal operation of a broiler 10 when regulation of the cooking temperature, quality, and/or "doneness" is insufficiently controlled through reliance on measured temperature inside the broiler alone. For example, initially after a piece of equipment is turned on, a typical software control system will operate the heat sources at a maximum thermal output in order to bring the broiler up to temperature. Even with such operation, it may take some broilers a significant amount of time (for example 20-40 minutes) for the broiler 10 to reach an internal setpoint temperature within the enclosure 14. Similarly, some types of broilers may permit software or the user to increase or decrease the cooking temperature to achieve a specific cooking recipe. In this case, the broiler will require time to reach its new setpoint temperature (higher or lower). Over some or all of this time, the software controller may direct the heat sources at maximum or minimum thermal energy output.

The inventors have made improvements to improve upon these identified drawbacks. The solution disclosed herein includes two parts. First the controller 32 operates to identify when there is a condition of limited control authority of one or more of the heat sources to control the cooking of a food product. Secondly, the controller 32 responds to this identified condition by dynamically modifying the cook speed by controlling the speed of the conveyors 22A, 22B to achieve the target cooking of the food product. Herein cooking of a food product means thermally treating a food product to achieve an internal food product temperature, a food product quality, and/or a food product "doneness."

In a still further example of the solutions as disclosed herein, the controller further makes a determination based upon an input of the food product to be cooked on each of the cooking conveyors 22A, 22B. In this example, the controller further determines if one or both of the cooking conveyors 22A, 22B are used to cook a food product that is susceptible to the limited control authority condition as described. In the event that one or both of the cooking conveyors 22A, 22B are being used for such cooking, then the controller dynamically modifies the cook speed as described herein for the cooking conveyor 22A, 22B being used to cook the susceptible food product. Non-limiting examples of potentially susceptible food products may be a chicken breast or a frozen hamburger patty.

In arriving at this solution, the inventors have recognized related conditions which are addressed with the solution as described herein. These related conditions include that the primary method of cook quality control is temperature feedback controlling the heat source thermal output. Further, a scenario arises in which the heat source is at either maximum or minimum output, limiting the feedback control of the heat source to achieve the target cooking of the food product. Because the heat source is at either a maximum or minimum output, control authority is limited and the temperature stays outside of the setpoint range for longer than desirable.

The conveyor speed response to a limited control authority condition as described herein may be a constant value, or it may be dynamically tied to the temperature or other measured quantity of the broiler. The speed response may be the same for all food products, or it may be different based on the product being cooked. It may be applied to all conveyors, or only to some, based on different locally measured temperatures or applied when the food products being cooked on different conveyors are dissimilar.

Figure 3A:
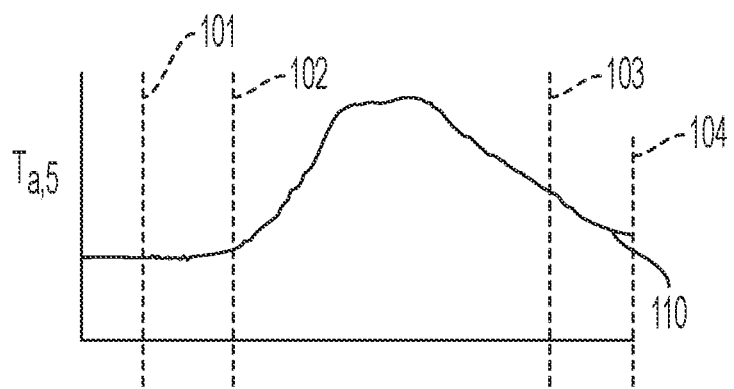
FIGS. 3A-3F provide time, temperature, and speed curves exemplary of different operating conditions of the broiler.

FIGS. 3A-3G show different conditions of the broiler 10 (as described above) on a common time scale. FIG. 3A shows the temperature 110 of the broiler, measured by the temperature sensors 36A, 36B. For this example, the measured temperature is the average of the individual temperatures measured by temperature sensors 36A, 36B; however, other examples may measure temperature differently, including independent monitoring and control based upon each of temperature sensors 36A, 36B. Temperature is relatively stable when the broiler is idling (not cooking). At time 101, food product (in this example, a large number of frozen hamburgers) is introduced.

Figure 3B:
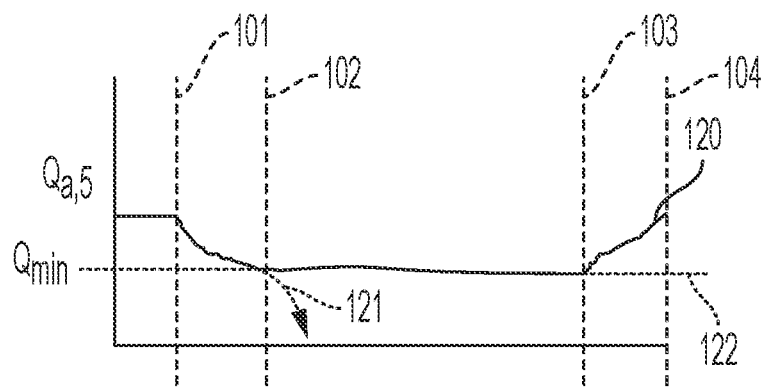

FIG. 3B shows the heat output 120 of the heat sources 12 (in this example, gas burners) over this same time. At time 101, the introduction of a greasy food product begins causing flare-ups. The software control system responds by decreasing the heat output of the burners to compensate for the added heat of burning grease. Between times 101 and 102, temperature remains stable as heat output slowly decreases and grease combustion (not shown) increases due to the natural cooking response of the burgers.

At time 102, the software controller lowers the heat output 120 to a hardware limit (122). At this point, a theoretically perfect control system would continue lowering the heat output (as shown by 121) below this limit to compensate for the continuously-added heat of combusting grease. However, many burners cannot be reduced in temperature below a set minimum limit (122) without risking non-optimal operation. For example non-optimal operation may include intermittent or incomplete combustion or a loss of temperature response time to subsequent temperature change inputs or heat source controls. Therefore the actual heat output of the burner (120) matches the lower limit (122) at this time, and stays there. Because the heat output (120) is now higher than what is required (121) to control the temperature, temperature (110) at time 102 begins to rise.

This temperature rise would result in undesirable cooking temperature, quality, or "doneness," and this result exceeds the temperature control system's ability to regulate against. FIGS. 3C-3G provide examples of how speed may be modified for different detected limited control authority based upon the heat source operation.

As previously noted, in some cases, a high temperature reading may be due to a localized flare-up and heat source control with this unrepresentative temperature may result in cooked product being under the intended temperature. For example, this may happen on a broiler such as shown in FIGS. 2A and 2B, with two independent cooking conveyors 22A, 22B. In this case, a greasy product, such as a hamburger 28A may be cooked on cooking conveyor 22A, causing a large amount of flames 38. At the same time, a dissimilar product, such as a piece of chicken 28B may be cooked on cooking conveyor 22B, causing little or no flame. The control system may see the overall temperature (for example as measured as the average of temperature readings from sensors 36A and 36B rise significantly and throttle the heat energy as shown in FIG. 3B. In other examples, a localized flare-up may be detected based upon a rapid change in temperature sensed by one or more temperature sensors, particularly when sensed by one or a few sensors located proximate to one another. The rapid change may be detected from the sensor signals as a threshold temperature, a threshold temperature above the set point temperature, or may be a rate of temperature change. In still further examples, one or more cameras or image capture devices may capture digital images which can be analyzed using image processing techniques to detect flames and flare-ups within the broiler, and from such image analysis, determine the location of the flare-up as well.

Figure 3C:
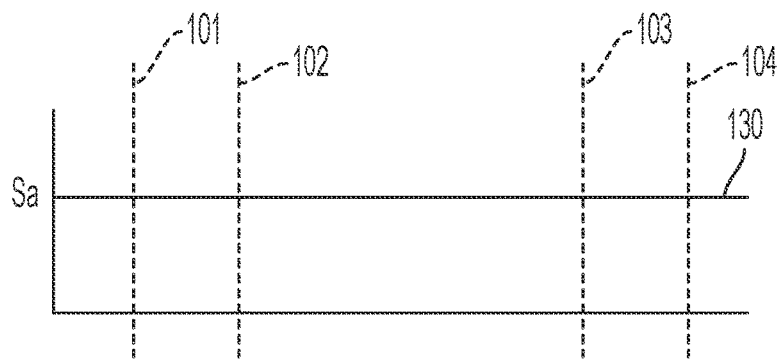
Figure 3D:
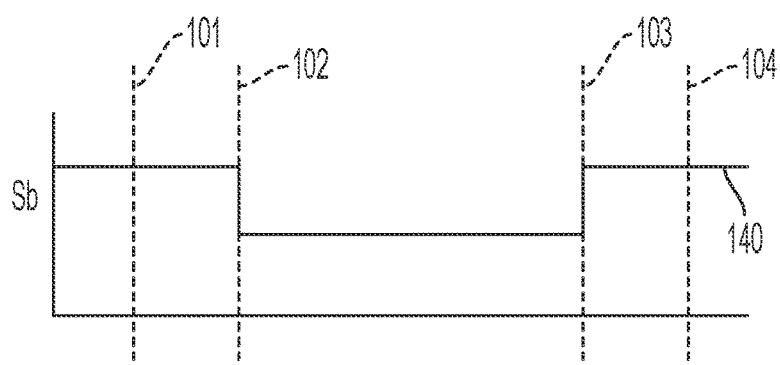

This change in the thermal conditions within the broiler 10 may still result in a suitable cook temperature for the hamburgers 28A on the cooking conveyor 22A due to the added heat of combustion from the flames 38. However, the same cook energy applied may be insufficient to cook the chicken 28B on cooking conveyor 22B. In this case, the controller 32 may operate the cooking conveyor 22B to decrease the speed of the conveyor 22B to provide a longer cook time for the chicken 28B on the cooking conveyor 22B. Since the cooking conveyor 22A exemplarily does not share this problem (due the extra heat added to the system from the flame 38), the speed 130 of the cooking conveyor 22A may remain unchanged as shown in FIG. 3C.

Figure 3E:
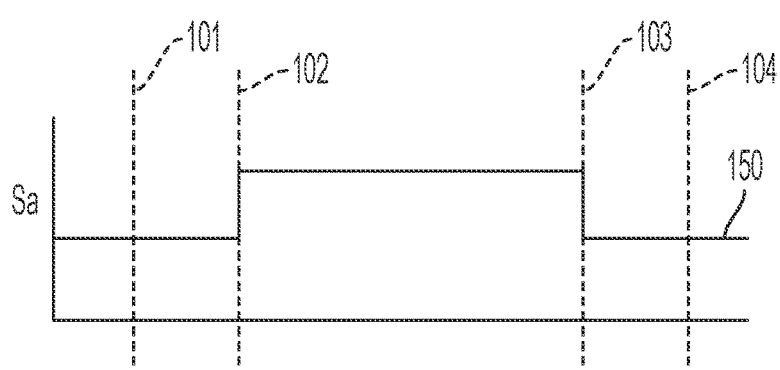
Figure 3F:
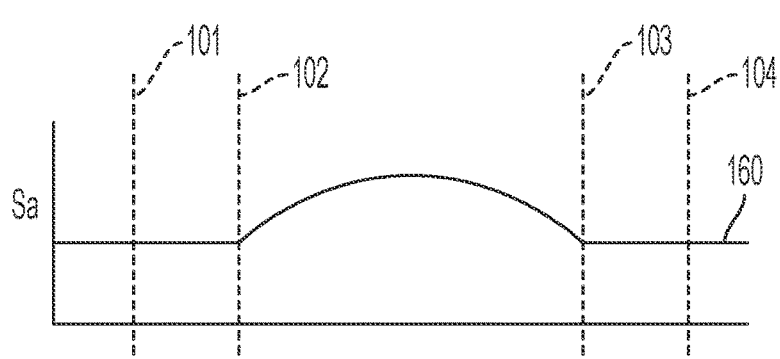

In a further example, as shown with reference to FIGS. 3E and 3F, the heat added from the flames 38 of the grease combustion may result in overcooking of the food product 28A. For some food products or scenarios, the software controller 32 may be programed to increase the belt speed when the supplied cook energy 120 is minimized at time 102. In this case, the cook speed 150 may be increased to prevent product overcooking that would otherwise result from the added heat of grease combustion as represented in FIG. 3E. In another example, this speed 160 (e.g. and the increase thereof) may be dynamically tied to the measured temperature 110 as is exemplarily shown in FIG. 3F.

In the examples as provided in FIGS. 3A-3F, conditions may change as flare-ups are extinguished or as product enters the broiler. At an exemplary time 103, the temperature is near the set point and the heat source is no longer operated to only minimize or maximize heat output 120. Once this condition is detected, the software controller may reset the speeds of the cooking conveyors 22A, 22B to the initial speed value as at time 101.

In the examples provided in FIGS. 3A-3F, a temperature 110 that is excessively high due to a flare-up may result in operation by the controller 32 for a minimized heat output 120 by the heat sources 12. However, it will be recognized that conditions may exist in which the opposite (a cold influx causing a maximized heat transfer control signal) is also possible. One example is a large inrush of very-low-temperature (e.g. frozen) product cooling the broiler significantly.

Figure 4A:
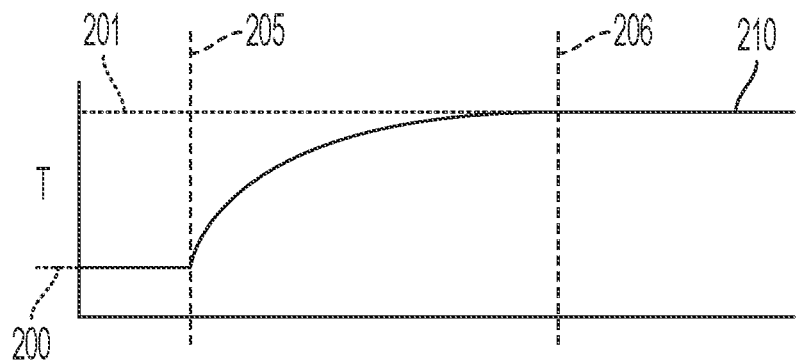
FIGS. 4A-4C provide time temperature and speed curves exemplary of different operating conditions of the broiler.
Figure 4B:
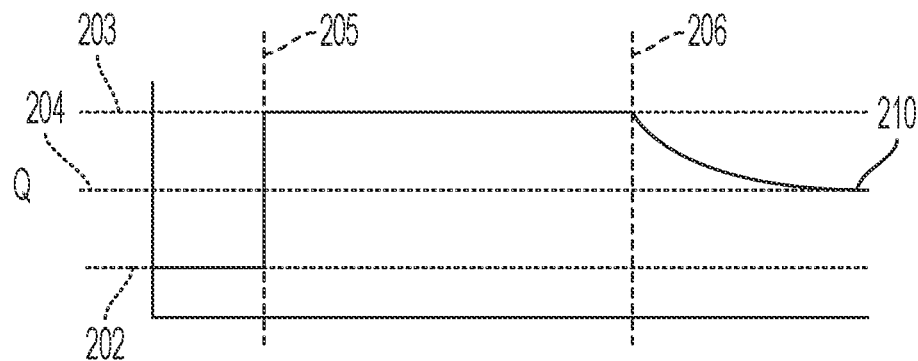
Figure 4C:
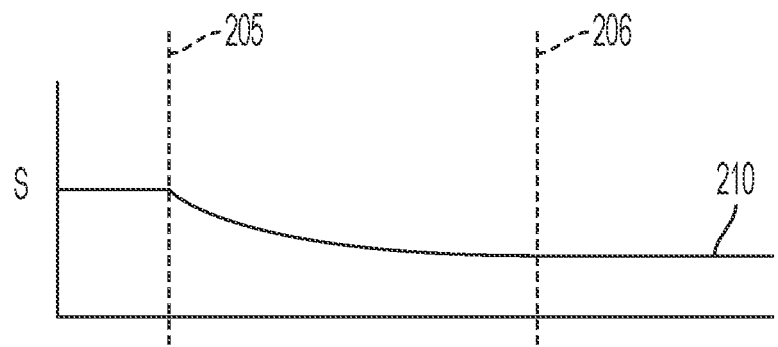

Further examples are provided with reference to FIGS. 4A-4C. At time 205, the setpoint temperature is changed from a lower temperature to a higher temperature. This may represent turning the machine on (moving from a very low temperature to a very high temperature) or it may represent a recipe-driven temperature change (moving from a moderate temperature for slow-cooking delicate food product to a very high temperature for seared cooking). The temperature 206 increases from the original temperature 200 to the new setpoint temperature 201, which is reached at time 206.

Due to the abrupt change in setpoint temperature as depicted in FIG. 4A, the software controller quickly changes the heat output 220 from a low level 202 to a hardware maximum 203 as depicted in FIG. 4B. Around the time the setpoint 206 is reached, the software control begins reducing the heat output 220 of the heat source, which will eventually settle at a new stable level 204.

Typical broilers require that no food product be loaded between times 205 and 206, since the temperature is rapidly changing and the output cooked food temperature, quality, or "doneness" cannot be controlled. However, as depicted in FIG. 4C, the belt speed 230 may be dynamically changed in time from time 205 to 206 to ensure that each food product cooked during that time receives a constant heat input despite the changing temperature. The exact speed chosen at any time may be based off the measured temperature 210, the applied heat input 220, a hard-coded speed over time curve, or may be algorithmically determined as a combination of any of these methods. The exact speed curve 230 required for proper cooking will depend on the exact method of heat transfer and cooking and may be determined experimentally.

While the example of a setpoint change from a low temperate to a high temperature is used above, the same case may be inverted for a decrease in setpoint temperature. In this case the heat output 220 would instead reach a minimum between times 205 and 206 as temperature 210 drops.

In any of the above examples, for example as described above with respect to FIGS. 3A-F and 4A-C in which the software controller acts depending on what product is on the lane, that product may either be automatically detected (by a camera or other similar method) or be inferred from user selection. For example, a broiler may have distinct "recipes" of time and temperature for each food product the user must select from before cooking.

However, the inventors have observed that temperature gradients develop within the open interior 58 of the enclosure 14. The broiler 10 is observed to lose heat near the inlet 16 and the outlet 18. This loss of heat can be compensated for by operation of the heat sources 12 closest to the inlet 16 and the outlet 18 to output increased heat to compensate for this loss. However, because the food products are often moving in a continuous manner from the inlet 16 to the outlet 18, these differences in temperature affect food products on the conveyor relatively evenly. The inventors have observed that a further temperature gradient develops within the open interior 58 of the enclosure 14 with higher temperatures at the center of the open interior 58 and lower temperatures at the sides of the enclosure 14. As this temperature gradient results in consistently higher temperatures at the center of the conveyor 22 as opposed to the sides of the conveyor, this temperature gradient results in inconsistent thermal treatment of food products moving through the broiler in parallel. In one example, two food products 28 on the conveyor 22 side-by-side may experience more thermal treatment and cooking of the respective halves toward the centerline of the conveyor 22 and less thermal treatment and cooking on the halves towards the edges of the conveyor 22. In a further example of three food products 28 on the conveyor 22 side-by-side, the food product 28 in the center may experience greater thermal treatment and cooking than the two food products at the edges of the conveyor 22.

Drafts and/or internal air circulation within the interior of the appliance can be one cause of the heat gradients to develop within the open interior 58. Furthermore, the inventors have found that conductive and radiant heat losses further contribute to these gradients. For example, the sides of the broiler radiate heat external of the broiler, cooling the air in proximity to the sides relative to the air at the center of the open interior. This typically causes a heat gradient to develop with hotter temperatures occurring at the center of the appliance and cooler temperatures occurring at the sides of the appliance.

In response to this observation, the solutions disclosed herein have been developed to reduce this side-to-side temperature gradient and to improve thermal treatment and cooking consistency across the width of the open interior 58 along the conveyor. These solutions provide heating elements with shaped effective element surfaces. These shaped effective element surfaces operate to provide a larger heating element surface, and thus more heat, towards the sides of the open interior 58 and less heat towards the center of the open interior 58.

Figure 5:
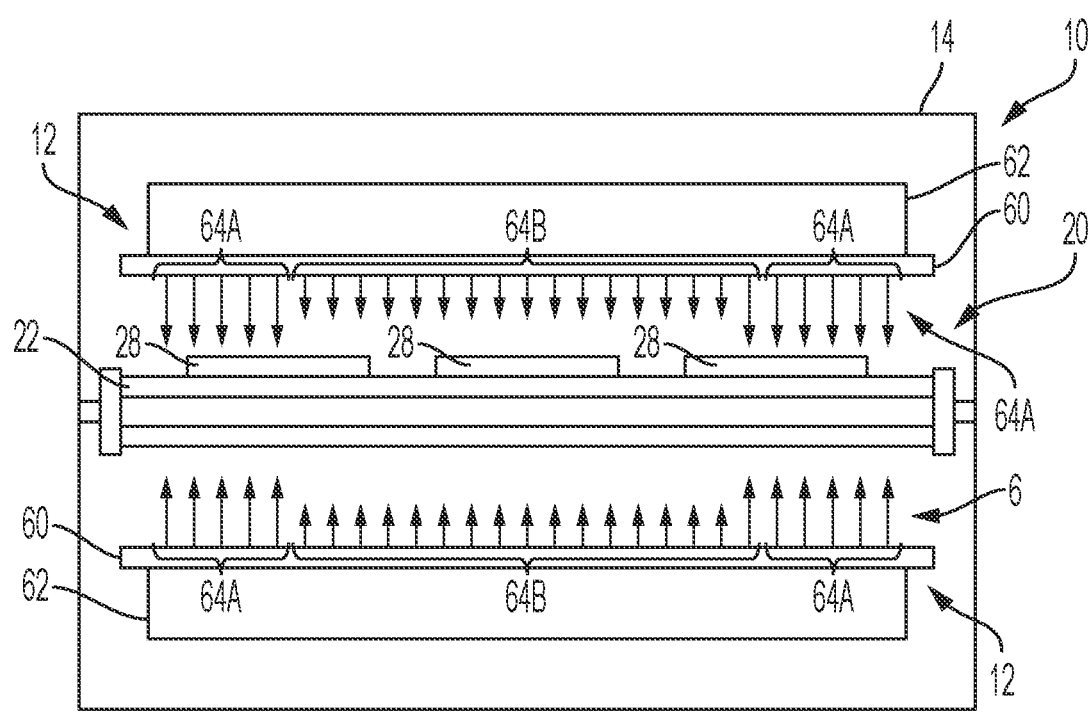
FIG. 5 is a partial cross-sectional view of an example of a broiler as noted by line A-A of FIG. 1.

FIG. 5 is a partial cross-sectional view of FIG. 1, for example taken along line A-A. It will be recognized that the description provided herein may be combined with the description of features provided above, although for the sake of conciseness, the description of these features are treated separately. The broiler 10 is arranged with three food products 28 side-by-side on the conveyor 22. The heat sources 12 depicted in FIG. 5 include a heating element 60 and a plenum 62. The plenum 62 directs an air and gas combustion mixture into the heat source 12. The heating element 60 is exemplarily constructed of a nickel-chromium-aluminum metal foam, although other constructions of heating elements will be recognized. In an example of the heat source 12, combustion of the air-gas mixture heats the heating element 60 which in turn transfers heat to the open interior 58 and the food products 28 by conductive, convective, and radiative heat transfer. It will be recognized that while such a heat source is depicted herein, other forms of heat sources, including heat sources with electrical heating elements may be used as well. As shown in FIG. 5 and described in further detail herein, the surface area (and thus heat output 64A) of the heating element 60 is reduced towards the center of the open interior 58, while the surface area (and thus heat output 64B) of the heating element 60 is greater towards the sides of the enclosure 14.

While in embodiments, this can be achieved by shaping the heating element 60 itself to produce an effective surface area of the heating element 60, this can present challenges to the continued operation of the heat source 12, as the plenum 62 geometry becomes challenging and complex to design and manufacture to achieve even heating of the heating element 60. Therefore, the heating element 60 is partially masked with static and/or dynamic masks 46, described in further detail herein, to limit the effective surface area of the heating element 60.

Figure 6A:
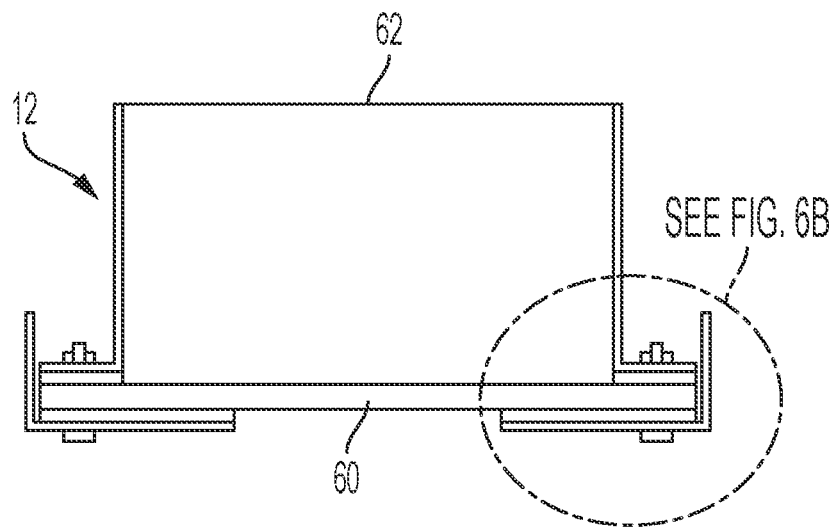
FIG. 6A depicts an example of a heat source.
Figure 6B:
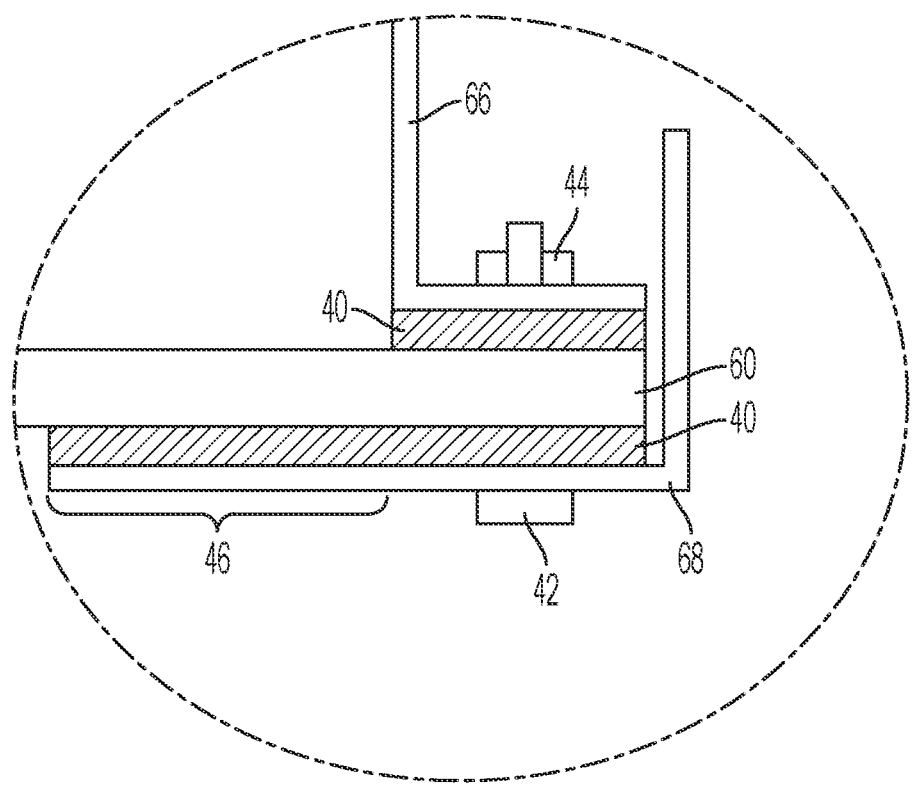
FIG. 6B is an inset close-up of a portion of a heating element with a heating element mask.

FIG. 6A depicts a heat source 12 and FIG. 6B is an inset close-up of a portion of an heating element 60 with a heating element mask 46. As shown in enlarged detail in the inset, the heating element 60 is secured between a wall 66 of the plenum 62 and a mounting flange 68 which secures the heating element 60 within the broiler (not depicted). Insulating gaskets 40 space the heating element 60 apart from direct contact with the respective wall 66 and flange 68. The insulating gaskets 40 are exemplarily a fiber paper, for example, the LYTHERM LDF paper available from Lydall Performance Materials. However, it will be recognized that other materials may be used, for example other materials which provide temperature stability and low thermal conductivity, including but not limited to ceramic fiber materials. The insulating gaskets 40 limit conductive heat transfer from the heating element 60 to the wall 66 and to the flange 68. A fastener 42 through the flange 68, gaskets 40, heating element 60 and the wall 66 is exemplarily fixed with a nut 44 to secure the assembly together.

As will be explained in further detail herein, a mask 46 extends, exemplarily from the flange 38 interior across the surface of the heating element 24. The mask 46 is exemplarily constructed of the same materials as the insulating gasket 40 and the flange 38, which is exemplarily stainless steel and an insulative material. In one example the mask 46 is an extension of the insulating gasket 40 and the flange 38. Since the mask 46 limits conductive and radiative heat transfer from the heating element 60 to the open interior of the broiler and the food products positioned therein (not depicted). This limits the effective surface area of the heating element 60 to the areas that are not covered by the mask 46. Different configurations of masks 46 as disclosed herein have been found to reduce the temperature gradients within the broiler and improve heat treatment and cooking consistency.

While the above example described a mask 46 that is an extension of or unitary to the flange 38, it will be recognized that in other examples, the mask can be removably installed relative to the heating element 24. In an example, the mask 46 may be part of the mount or cradle in which the heat source 12 sits to support the heat source within the broiler. In further examples as described herein, the masks 46 may be portions of or connected to supporting flanges or brackets, may be separately constructed and secured components, or may be incorporated into the design/construction of the heating elements 60 themselves. It will further be recognized that within a broiler, for example a broiler 10 as depicted in FIG. 1 with multiple heat sources 12, that the masks 46 may be different in sizes, shapes, material, or function as described in the examples herein at different positions within the broiler 10.

Figure 7A:
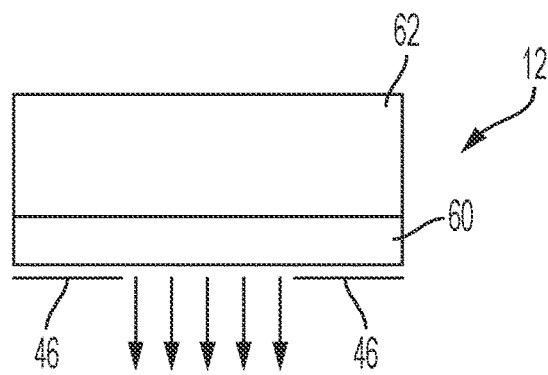
FIGS. 7A-7C depict examples of heating element cross sections and masks.
Figure 7B:
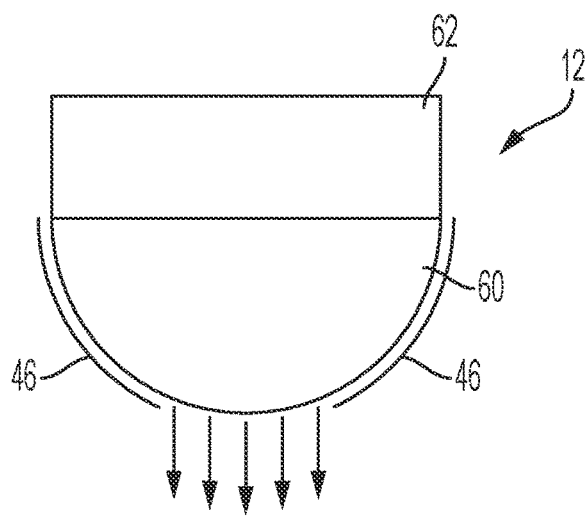
Figure 7C:
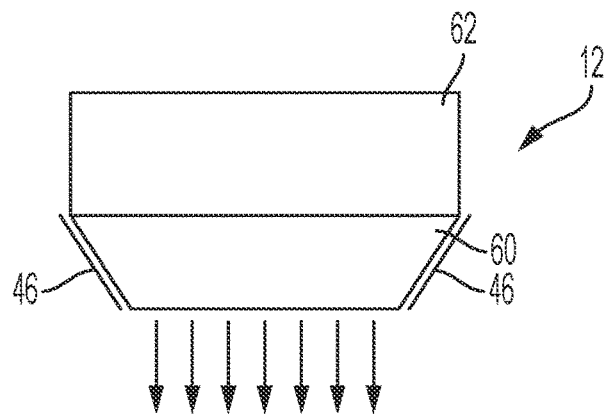

FIGS. 7A-C depict examples of heat source 12 cross sections and masks 46 shaped to fit the contours of the heating elements 60. The heating elements 60 may take a variety of cross-sectional shapes, including the flat element shown in FIG. 7A. Alternative shapes to the flat element include, but are not limited to, a curved surface as shown in FIG. 7B or an angular surface, for example taking the shape of a trapezoid as shown in FIG. 7C. In examples, the masks 46 are contoured to match a shape of the heating element 60 to which the mask is applied, for example flat, curved, or angular. The masks 46 reduce conductive and radiative heat transfer from the heating elements 60. Therefore, in regions of the heating element 60 in which the masks 46 cover a portion of the heating element 60, the effective heat transfer from the heating element 60 in those regions is reduced.

FIGS. 8A-D depict examples of different configurations of masks 46 and the effective surface area 48 of the heating element 60. In each of these examples the heating element 60 has a larger effective surface area across distance D1 at the ends of the heating element 60, and a reduced effective surface area across distance D2 at the middle of the heating element 60. It will be recognized that the ends of the heating element 60 are positioned towards the sides of the enclosure (not depicted). As shown in FIGS. 8A-D, the masks 46 may be rectangular, producing a step-wise change between distances D1 and D2. However, in other examples, the shape of the masks 46 may be curved or angled to produce a transition area of decreasing distances between D1 and D2. Lastly, as shown in FIG. 8D, the masks 46 may be completely curved and/or variable, narrowing the effective surface area 48 to a minima at D2. Looking additionally to FIG. 5, since the effective surface area 48 of the heating element 60 is greatest at D1, this produces the region of increased heat output 64A in FIG. 5. The effective surface area 48 of the heating element 60 is the smallest at D2, and this produces the region of decreased heat output 64B in FIG. 5.

Figure 9A:
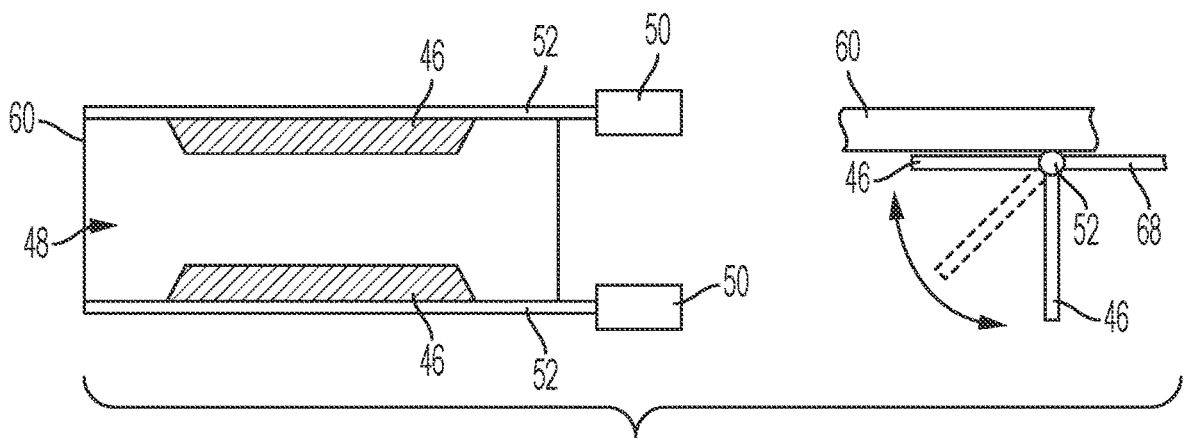
FIGS. 9A-9C depict examples of dynamic heating element masks.
Figure 9B:
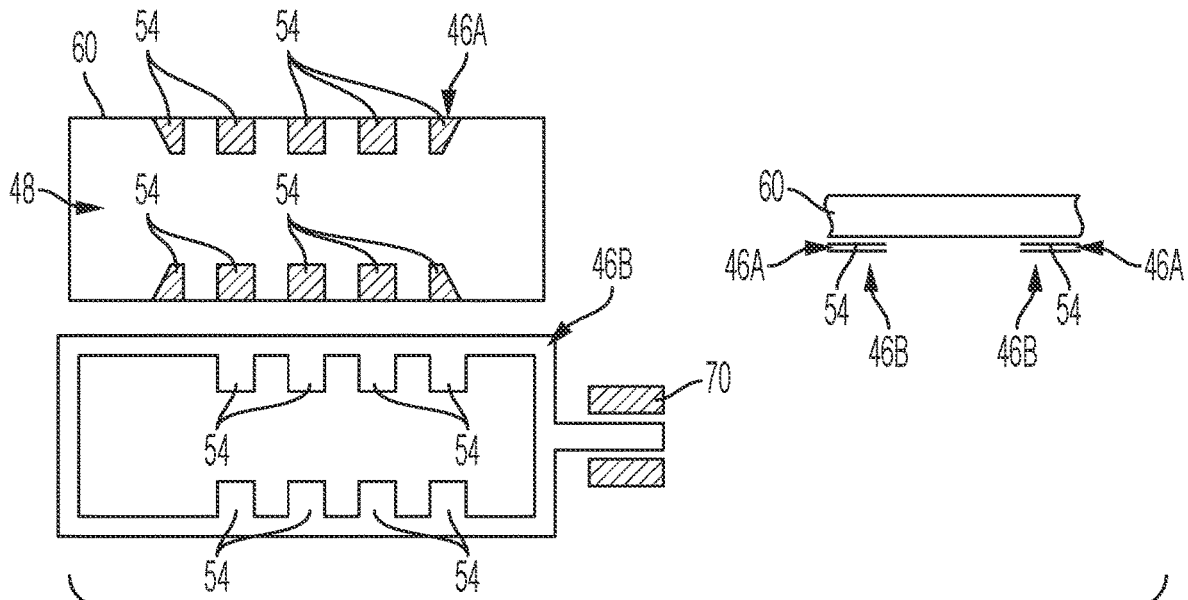
Figure 9C:
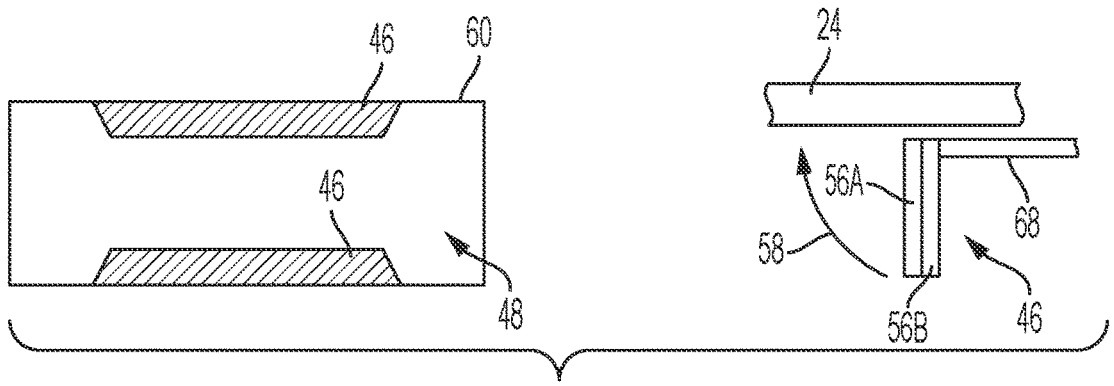

FIGS. 9A-9C depict examples of dynamic heating element masks. In still further examples, the masks 46 may be movable or dynamic in a manner that provides a variable and controlled effective surface area 48 of the heating elements 60. These examples provide a further advantage over a heating element 60 with an effective surface area 48 shaped by a mask 46 as previously described. A dynamically shaped effective heating element surface area 48 provides greater control of the thermal effects provided by the heating elements 60 over that which can be provided with either a standard heating element 60 or a heating element 60 with a static mask 46. The dynamic heating element masks 46 as described herein operate to provide selective control of the effective heating element surface area 48. This may be used, for example, during broiler "warm up" or "self-clean" cycles. The FIGS. 9A-9C provide three different examples of dynamic broiler masks and a person of ordinary skill in the art will recognize further movement mechanisms or configurations based upon the disclosure of these three examples.

FIG. 9A provides masks 46 that are rotatable relative to the heating element 60. A motor 50 rotates a hinge rod 52 to move the masks 46 that are rotated about the hinge rod 52 relative to the heating element 60. In this example, temperature probes (not depicted) within the enclosure 14 may measure temperatures of the open interior 58, providing information regarding a temperature gradient within the open interior 58. In response to such gradient developing, or a detected gradient that with a temperature differential greater than a predetermined amount, the controller 32 may provide a signal to the motor 50 to position the masks 46 closer to the heating element 60. As with other examples provided herein, this control may be localized to one heating element 60 or a subset of the heating elements 60 of the broiler 10. Thus, adjustments to the operation of the broiler by control of the positions of the masks 46 may be used to vary operations between conditions where the full heating elements 60 may be exposed, for example, "warm up" of the broiler or when a single line of food products are placed in the center of the conveyor.

FIG. 9B depicts a further example of a dynamic masking of the heating element 60. This example uses a static mask 46A and a movable mask 46B. A translation device 70, which may include linear motor, stepper motor, electromagnetic coil and plunger arm, a linear actuator or another similar device capable of providing linear translational movement is secured to the movable mask 46B. The static mask 46A and the movable mask 46B both include "teeth" 54 of masking material. The teeth 54 are separated by spaces. In an example, the teeth 54 of both masks 46A, 46B are of the same dimensions and the spaces between respective teeth 54 are of the same width as the teeth 54. The linear translator moves the movable mask 46B between a first position wherein the teeth 54 of the movable mask 46B are in alignment with the teeth 54 of the static mask 46A and a second position wherein the teeth 54 of the movable mask 46B are positioned in alignment with the spaces between the teeth 54 of the static mask 46A. Thus, in the first position, there is a greater effective surface area 48 of the heating element 60, while in the second position, the effective surface area 48 of the heating element 60 is minimized. Operation of the movable mask 46B to a position with the teeth 54 in partial alignment with the teeth 54 of the static mask 46A allows for further modulation and control of the effective surface area 48 of the heating element 60. Similar to the example provided above with respect to FIG. 9A, this active control and operation of the movable mask 46B can be carried out by the controller 32 of the broiler 10 in response to an operation condition or sensed temperature/temperature gradient.

FIG. 9C depicts a further example of a dynamic mask 46, however the mask provided in FIG. 9C is configured as a passively dynamic mask. The masks 46 may be exemplarily shaped in any of the shapes of other masks as described herein. The mask 46 is exemplarily constructed with two layers 56A, 56B of different material, the different materials having different coefficients of thermal expansion. In an example, one of the materials is stainless steel, while the other material is aluminum. In this example, aluminum has a greater thermal expansion coefficient than stainless steel and therefore increases in size to a greater degree than stainless steel. Copper is another example of a material with a relatively high thermal expansion coefficient. If the layer 54A closer to the heating element 60 is constructed of stainless steel and the layer 54B further from the heating element 60 is constructed of aluminum, then as the overall temperature of the mask 46 increases, then the layer 54B of aluminum will expand faster than the layer 54A of stainless steel and the mask 46 will bend towards the heating element 60, reducing the effective surface area of the heating element 60 to counteract temperature gradients within the open interior 58 of the broiler 10 when at operational temperature.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A heat transfer system for cooking multiple diverse food products, the heat transfer system comprising:
a heat source arranged within an enclosure and operable by a controller to emit heat energy into the enclosure;
a first cooking conveyor arranged within the enclosure to a first move food product through the enclosure past the heat source, wherein the heat source directs heat energy at the first cooking conveyor;
a second cooking conveyor arranged within the enclosure to move a second food product through the enclosure past the heat source, wherein the heat source directs heat energy at the second cooking conveyor;
further comprising at least one temperature sensor located within the enclosure, wherein the at least one temperature sensor provides temperature measurements to the controller for use in operating the heat source with the controller to achieve a target temperature at the at least one temperature sensor within the enclosure;
wherein speeds of the first cooking conveyor and the second cooking conveyor are independently controlled to adjust a cooking time of the first food product relative to the second food product;
wherein the controller identifies a limited control authority condition of the heat transfer system upon a detection of a flare-up condition localized to the first cooking conveyor or the second cooking conveyor and operates at least one of the first cooking conveyor or the second cooking conveyor in response to the identification of the limited control authority condition; and
wherein the flare-up condition is localized to the first cooking conveyor, and in response to the detection of the flare-up condition, the controller operates to decrease a speed of the second cooking conveyor.

2. The heat transfer system of claim 1, wherein the flare-up condition is detected based upon a rapid localized increase in temperature.

3. The heat transfer system of claim 1, wherein the flare-up condition is detected based upon imaging within the enclosure.

4. The heat transfer system of claim 1, wherein the flare-up condition is localized to the first cooking conveyor, and in response to the detection of the flare-up condition, the controller operates to increase a speed of the first cooking conveyor.

5. The heat transfer system of claim 1, wherein the at least one temperature sensor comprises a first temperature sensor configured to measure a temperature at the first cooking conveyor and second temperature sensor configured to measure a temperature at the second cooking conveyor, the controller monitors the temperature measurements from the first and second temperature sensors, and identifies the limited control authority condition based at least in part upon the temperature measurements.

6. The heat transfer system of claim 5, wherein the limited control authority condition is identified by the controller upon a rapid localized increase in the temperature measurements by one of the first temperature sensor or the second temperature sensor.

7. The heat transfer system of claim 1, wherein the first food product is different from the second food product.

8. A heat transfer system for cooking multiple diverse food products, the heat transfer system comprising:
   a heat source arranged within an enclosure and operable by a controller to emit heat energy into the enclosure;
   a first cooking conveyor arranged within the enclosure to a first move food product through the enclosure past the heat source, wherein the heat source directs heat energy at the first cooking conveyor;
   a second cooking conveyor arranged within the enclosure to move a second food product through the enclosure past the heat source, wherein the heat source directs heat energy at the second cooking conveyor;
   wherein speeds of the first cooking conveyor and the second cooking conveyor are independently controlled to adjust a cooking time of the first food product relative to the second food product;
   wherein the heat source comprises a heating element configured to emit radiant heat from an effective surface area of the heating element having an elongated length dimension and having a width dimension perpendicular to the length dimension, wherein the width dimension of the effective surface area varies along the heating element.

9. The heat transfer system of claim 8, wherein the elongated length dimension is perpendicular to a direction of operation of the first cooking conveyor and the second cooking conveyor.

10. The heat transfer system of claim 9, further comprising a mask positioned between the heating element and the first and second cooking conveyors, wherein the mask defines a first width dimension of effective surface area of the heating element at the center of the enclosure and a second width dimension at sides of the enclosure, wherein the first width dimension is smaller than the second width dimension.

11. The heat transfer system of claim 9, further comprising a mask positioned relative to the heating element, wherein the mask defines the effective surface area of the heating element along the heating element, wherein the mask is movable relative to the heating element to modify the effective surface area of the heating element during operation of the heat transfer appliance.

12. The heat transfer system of claim 11, wherein the movement of the mask is responsive to a temperature within an open interior within the enclosure.

13. A heat transfer system for cooking multiple diverse food products, the heat transfer system comprising:
   a heat source arranged within an enclosure and operable by a controller to emit heat energy into the enclosure;
   a first cooking conveyor arranged within the enclosure to a first move food product through the enclosure past the heat source, wherein the heat source directs heat energy at the first cooking conveyor;
   a second cooking conveyor arranged within the enclosure to move a second food product through the enclosure past the heat source, wherein the heat source directs heat energy at the second cooking conveyor;
   further comprising at least one temperature sensor located within the enclosure, wherein the at least one temperature sensor provides temperature measurements to the controller for use in operating the heat source with the controller to achieve a target temperature at the at least one temperature sensor within the enclosure;
   wherein speeds of the first cooking conveyor and the second cooking conveyor are independently controlled to adjust a cooking time of the first food product relative to the second food product;
   wherein the controller identifies a limited control authority condition of the heat transfer system upon a detection of a flare-up condition localized to the first cooking conveyor or the second cooking conveyor and operates at least one of the first cooking conveyor or the second cooking conveyor in response to the identification of the limited control authority condition; and
   wherein the flare-up condition is localized to the first cooking conveyor, and in response to the detection of the flare-up condition, the controller operates to increase a speed of the first cooking conveyor.

14. The heat transfer system of claim 13, wherein the flare-up condition is detected based upon a rapid localized increase in temperature.

15. The heat transfer system of claim 13, wherein the flare-up condition is detected based upon imaging within the enclosure.

16. The heat transfer system of claim 13, wherein the at least one temperature sensor comprises a first temperature sensor configured to measure a temperature at the first cooking conveyor and second temperature sensor configured to measure a temperature at the second cooking conveyor, the controller monitors the temperature measurements from the first and second temperature sensors, and identifies the limited control authority condition based at least in part upon the temperature measurements.

17. The heat transfer system of claim 16, wherein the limited control authority condition is identified by the controller upon a rapid localized increase in the temperature measurements by one of the first temperature sensor or the second temperature sensor.

18. The heat transfer system of claim 13, wherein the first food product is different from the second food product.

* * * * *